United States Patent
Gattami et al.

(10) Patent No.: US 10,165,587 B2
(45) Date of Patent: *Dec. 25, 2018

(54) METHOD AND BASE STATION FOR SUPPORTING D2D COMMUNICATION

(71) Applicant: Telefonaktiebolaget LM Ericsson (publ), Stockholm (SE)

(72) Inventors: Ather Gattami, Stockholm (SE); Gabor Fodor, Hässelby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/037,462

(22) PCT Filed: Nov. 19, 2013

(86) PCT No.: PCT/SE2013/051362
§ 371 (c)(1),
(2) Date: May 18, 2016

(87) PCT Pub. No.: WO2015/076711
PCT Pub. Date: May 28, 2015

(65) Prior Publication Data
US 2016/0286571 A1    Sep. 29, 2016

(51) Int. Cl.
*H04W 72/12* (2009.01)
*H04W 24/10* (2009.01)
(Continued)

(52) U.S. Cl.
CPC ......... *H04W 72/1263* (2013.01); *H04W 4/70* (2018.02); *H04W 24/10* (2013.01); *H04W 76/14* (2018.02)

(58) Field of Classification Search
None
See application file for complete search history.

(56) References Cited

U.S. PATENT DOCUMENTS

2007/0115884 A1*  5/2007  Shang ................... H04W 36/30
                                                      370/331
2010/0050001 A1*  2/2010  Grob .................... H04W 52/06
                                                      713/310
(Continued)

FOREIGN PATENT DOCUMENTS

WO    2012166969 A1    12/2012

OTHER PUBLICATIONS

3GPP, "3rd Generation Partnership Project; Technical Specification Group Services and System Aspects; Feasibility study for Proximity Services (ProSe) (Release 12)", 3GPP TR 22.803 V12.2.0, Jun. 2013, 1-45.

(Continued)

*Primary Examiner* — Kibrom T Hailu
(74) *Attorney, Agent, or Firm* — Murphy, Bilak & Homiller, PLLC

(57) ABSTRACT

A method and base station (800) for supporting Device-to-Device, D2D, communication over a D2D radio link between a first wireless device (D1) and a second wireless device (D2). The base station (800) obtains a first path gain (G12) of the D2D radio link, a second path gain (G1) of a cellular radio link between the base station (800) and the first wireless device (D1), and a third path gain (G2) of a cellular radio link between the base station (800) and the second wireless device (D2). The base station (800) then applies a D2D communication mode with network coding for the D2D communication when the first, second and third path gains (G12,G1,G2) satisfy a threshold condition.

19 Claims, 6 Drawing Sheets

(51) Int. Cl.
*H04W 4/70* (2018.01)
*H04W 76/14* (2018.01)

(56) References Cited

U.S. PATENT DOCUMENTS

| | | | |
|---|---|---|---|
| 2010/0165882 A1* | 7/2010 | Palanki | H04W 8/005 370/254 |
| 2010/0169498 A1* | 7/2010 | Palanki | H04W 16/14 709/228 |
| 2011/0228666 A1* | 9/2011 | Barbieri | H04W 76/023 370/216 |
| 2011/0258313 A1* | 10/2011 | Mallik | H04W 8/005 709/224 |
| 2012/0129562 A1* | 5/2012 | Stamoulis | H04W 76/023 455/517 |
| 2012/0184306 A1* | 7/2012 | Zou | H04W 76/023 455/458 |
| 2012/0213173 A1* | 8/2012 | Malladi | H04B 7/15521 370/329 |
| 2014/0179330 A1* | 6/2014 | Du | H04W 76/043 455/450 |
| 2014/0308954 A1* | 10/2014 | Wang | H04W 36/165 455/436 |

OTHER PUBLICATIONS

Ahlswede, Rudolf et al., "Network Information Flow", IEEE Transactions on Information Theory, vol. 46, Issue 4, Jul. 2000, 1204-1216.

Doppler, Klaus et al., "Device-to-Device Communication as an Underlay to LTE-Advanced Networks", IEEE Communications Magazine, vol. 47, Issue 12, Dec. 2009, 42-49.

Doppler, Klaus et al., "Innovative concepts in Peer-to-Peer and Network Coding", Celtic Telecommunication Solutions, Wireless World Initiative New Radio—WINNER+, CP5-026, D1.3, Jan. 16, 2009, pp. 1-25.

Fodor, Gábor et al., "Design Aspects of Network Assisted Device-to-Device Communications", IEEE Communications Magazine, vol. 50, Issue 3, Mar. 2012, 170-177.

Gaohui, Tian et al., "Device-to-Device Communication with Network Coding and Relay", IEEE Broadband Wireless Access Working Group, vol. 802.16, Nov. 17, 2013, 1-7.

Rodziewicz, Marcin, "Network Coding Aided Device-to-Device Communication", European Wireless 2012, Poznan, Poland, Apr. 18-20, 2012, 1-5.

Unknown, Author, "Consideration of Interference Mitigation for D2D Communication", 3GPP TSG-RAN1 Meeting #74, R1-132993, Barcelona, Spain, Alcatei-Lucent Shanghai Bell, Aug. 19-23, 2013, 1-7.

* cited by examiner

| Gi (i=1,2) | G12 | G12-Gi | Mode |
|---|---|---|---|
| -- | $< \Theta_{D-D}$ | -- | 1. (Cellular) |
| $> \Theta_{BS-D}$ | $> \Theta_{D-D}$ | $> \Theta_{delta}$ | 2. (D2D, dedicated) |
| $< \Theta_{BS-D}$ | $> \Theta_{D-D}$ | $> \Theta_{delta}$ | 3. (D2D, reused) |
| $< \Theta_{BS-D}$ | $> \Theta_{D-D}$ | $< \Theta_{delta}$ | 4. (D2D + NWC) | ern
METHOD AND BASE STATION FOR SUPPORTING D2D COMMUNICATION

TECHNICAL FIELD

The present disclosure relates generally to a method and a base station of a radio network, for supporting Device-to-Device, D2D, communication over a D2D radio link between a first wireless device and a second wireless device.

BACKGROUND

When two wireless devices communicate with each other in a cellular radio network in a traditional manner, each wireless device communicates radio signals with a serving base station of the radio network by sending uplink radio signals to the base station as well as receiving downlink radio signals from the base station. This is the traditional way of communication in a radio network also when the two wireless devices are located somewhat close to one another and being served by the same base station. Recently, techniques have been developed to enable such wireless devices in a radio network to communicate radio signals with each other directly, as controlled by the radio network and using frequency spectrum licensed to the network, such that each wireless device receives and decodes the actual radio signals that are transmitted from the opposite, or "peer", wireless device. Bluetooth is another example of direct communication between wireless devices, although without control or involvement by any network.

Communication of radio signals may thus take place directly between the two wireless devices without the radio signals being communicated over the radio network via one or more base stations. In that case, the serving base station allocates radio resources, e.g. defined by time and/or frequency, which the wireless devices are allowed to use in the direct communication. Such direct radio communication between two wireless devices is commonly referred to as "Device-to-Device, D2D, communication" which term will be used throughout this disclosure.

In the field of cellular radio technology, the term "wireless device" is usually used and will be used in this disclosure to represent any wireless communication entity capable of radio communication with a cellular radio network including receiving and sending radio signals. Another common term in this field is "User Equipment, UE" which implies that the communication entity can be carried and operated by a human user, examples include mobile telephones, tablets and laptop computers. However, a wireless device in this context is not necessarily operated by a human user. It could also be a machine-to-machine type of device operating automatically such as a sensor, counter or measuring entity.

Further, the term "base station", sometimes also referred to as a network node, radio node, e-NodeB, eNB, NB, base transceiver station, etc., represents any node of a cellular radio network that is arranged to communicate radio signals with wireless devices. The base station described here may, without limitation, be a so-called macro base station or a low power base station such as a micro, pico, femto, Wifi or relay node, to mention some customary examples. Throughout this disclosure, the terms "network node" and "User Equipment, UE" can further be used instead of base station and wireless device, respectively.

The above D2D communication may thus be employed whenever the two wireless devices, also referred to as "peer devices" or just "peers", are close enough to one another to be able to receive and decode direct radio signals from the opposite peer. Thereby, it may be possible to reduce transmit power in the area and also to reduce interference, as compared to what is required to enable a serving base station to communicate radio signals with the wireless devices in the traditional manner.

However, there are several different modes of operation available that can be selected for the D2D communication, as schematically illustrated in FIG. 1. For example, the wireless devices D1 and D2 may communicate radio signals directly over a D2D link 100 on dedicated radio resources that are reserved exclusively for the D2D communication and cannot be used for other wireless devices in the cell, or on reused radio resources that are not reserved exclusively for the D2D communication but may be used for other wireless devices in the cell at the same time.

Another possibility is to employ so-called network assisted D2D communication where the base station BS applies Network Coding, referred to as NWC, on data that is transmitted in a radio signal between the devices D1, D2. In this mode of operation, the base station BS receives data e.g. from device D1 on a cellular radio link 102a and transmits the data in network coded form to device D2 on another cellular radio link 102b, thereby enabling the receiving wireless device D2 to use the network coded form of the data for decoding the radio signal from device D1.

However, it is a problem to know whether the operation mode of D2D communication with NWC can provide an improvement or not as compared to other operation modes. For example, D2D communication with NWC may in some circumstances require more transmit power and/or give rise to more interference than other operation modes would do under such circumstances.

SUMMARY

It is an object of embodiments described herein to address at least some of the problems and issues outlined above. It is possible to achieve this object and others by using a method and a base station as defined in the attached independent claims.

According to one aspect, a method is provided in a base station of a radio network, for supporting Device-to-Device, D2D, communication over a D2D radio link between a first wireless device and a second wireless device. In this method, the base station obtains a first path gain of the D2D radio link. The base station also obtains a second path gain of a cellular radio link between the base station and the first wireless device, and a third path gain of a cellular radio link between the base station and the second wireless device. The base station then applies a D2D communication mode with network coding for the D2D communication when the first, second and third path gains satisfy a threshold condition.

According to another aspect, a base station of a radio network is arranged to support D2D communication over a D2D radio link between a first wireless device and a second wireless device. The base station comprises a communication module which in turn comprises radio circuitry for conducting radio communication with the first and second wireless devices. The base station further comprises an obtaining module which is configured to:

obtain a first path gain of the D2D radio link,
obtain a second path gain of a cellular radio link between the base station and the first wireless device, and
obtain a third path gain of a cellular radio link between the base station and the second wireless device.

The base station also comprises a logic module which is configured to apply a D2D communication mode with network coding for the D2D communication when the first, second and third path gains satisfy a threshold condition. By implementing the above method and/or base station, beneficial usage of the operation mode of D2D communication mode with NWC may be achieved by enabling reduced transmit power with adequate signal decoding of signals received over the D2D radio link.

The above method and base station may be configured and implemented according to different optional embodiments to accomplish further features and benefits, to be described below.

BRIEF DESCRIPTION OF DRAWINGS

The solution will now be described in more detail by means of exemplary embodiments and with reference to the accompanying drawings, in which.

DETAILED DESCRIPTION

Figure 1:
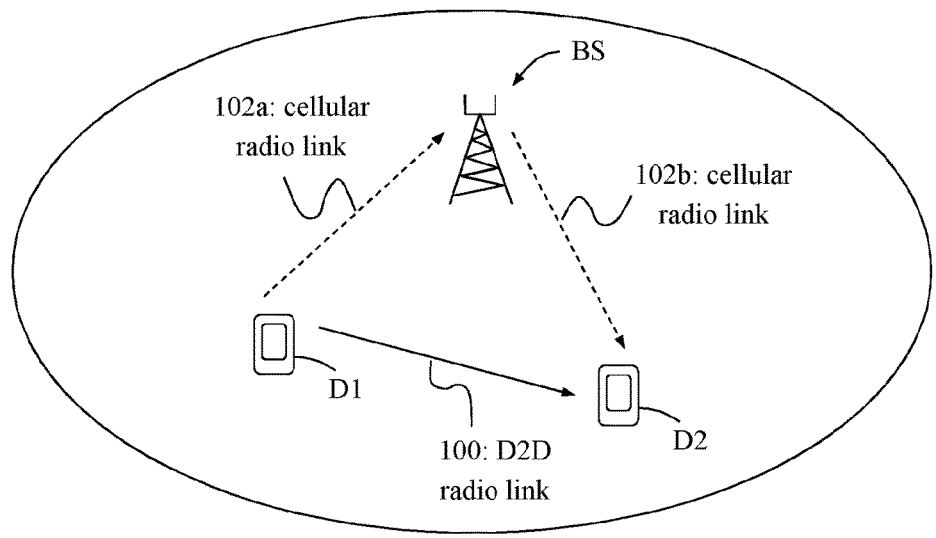
FIG. 1 illustrates a communication scenario with radio links for D2D communication and for cellular communication, according to the prior art.

A solution is provided to enable usage of D2D communication supported by NWC such that it may provide benefits such as enabling lower transmit power and reduced interference as compared to other operation modes. In this solution, it has been recognized that if the operation mode of D2D communication supported by NWC is applied for two communicating wireless devices only under certain required conditions, the benefit of enabling reduced transmit power to or from the devices may be achieved along with adequate decoding of received radio signals. For instance, such required conditions may be related to and depending on one or more of: the prevailing geometry of communication, shadowing and fading conditions, current inter-cell interference, signal propagation, and so forth. Various embodiments described herein may be implemented by functionality in a base station of a radio network when serving the two wireless devices.

Briefly described, the operation mode of D2D communication supported by NWC is applied for the wireless devices when a certain threshold condition is satisfied by a path gain of a D2D radio link between the two devices and by path gains of cellular radio links between the base station and the respective wireless devices. First, the base station obtains these path gains, which may be obtained by means of various signal measurements made by the devices and/or by the base station, e.g. relating to path loss. Second, the base station checks whether the above path gains satisfy the threshold condition and, if so, applies the operation mode of D2D communication with NWC for the D2D communication. Among other things, the threshold condition may require that the path gain of the D2D radio link is "strong", i.e. sufficiently high, and that the path gains of the cellular radio links are "weak", i.e. sufficiently low, in order to enable beneficial usage of the operation mode of D2D communication mode with NWC in terms of reduced transmit power and adequate signal decoding. Examples of how the threshold condition may be defined will be described in more detail later below.

An example of how NWC may be applied in practice to assist or support a D2D communication between two wireless devices D1 and D2, will now be described with reference to FIG. 2a which may be used for this solution. Once the D2D communication has been established, the first wireless device D1 sends data "x1" in a first radio signal to the second wireless device D2, and likewise the second wireless device D2 sends data "x2" in a second radio signal to the first wireless device D1, as indicated by arrows between the devices D1, D2. Basically, NWC is applied to enable the devices to decode the received radio signals with sufficient accuracy and reliability. The data x1 and x2 is also received by the base station BS, as indicated by respective arrows from the devices D1, D2 to the base station BS.

The base station BS then applies a network coding function "F" on the data x1 and x2 and sends a network coded form of the first and second data, denoted F(x1,x2), to both wireless devices D1 and D2, as indicated by dashed arrows from the base station BS to the devices D1 and D2, respectively. Thereby, the second wireless device D2 is able to use the network coded form of the first and second data F(x1,x2) for decoding the first radio signal x1, and likewise the first wireless device D1 is able to use the network coded form of the first and second data F(x1,x2) for decoding the second radio signal x2. An example of how this could be done will be described in more detail later below.

Figure 2A:
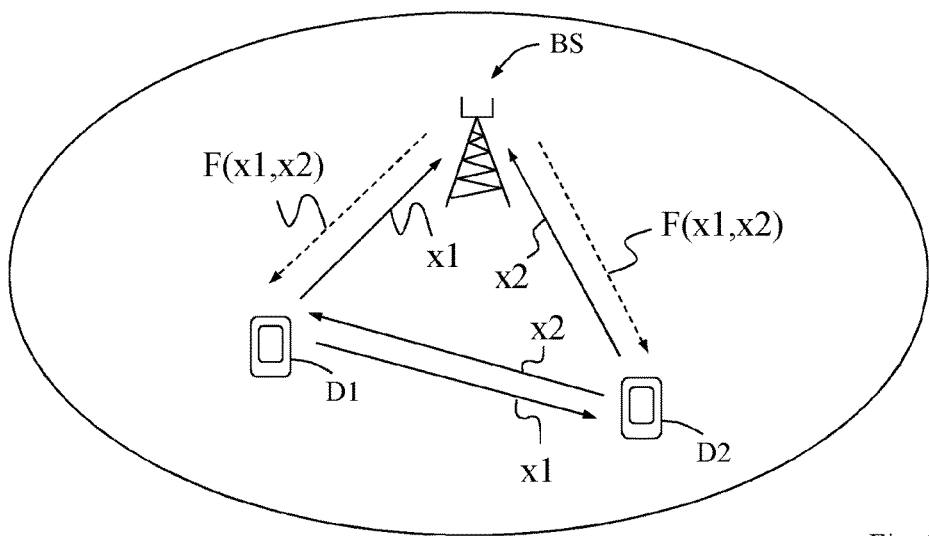
FIGS. 2a and 2b illustrate a D2D communication supported by network coding, which can be used in embodiments herein.
Figure 2B:
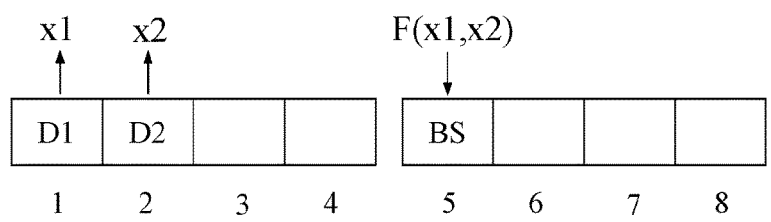

FIG. 2b illustrates an example of how the above data may be transmitted in different timeslots according to a Time Division Duplex, TDD, scheme, although it is possible to employ D2D communication with NWC for other transmission schemes as well. The example TDD scheme in FIG. 2b comprises a set of timeslots 1-4 dedicated for uplink transmissions and another set of timeslots 5-8 dedicated for downlink transmissions. In brief, the data x1 is transmitted from device D1 in timeslot 1, the data x2 is transmitted from device D2 in timeslot 2, and the network coded form F(x1,x2) is transmitted from the base station BS in timeslot 5. The above procedure may be described in more detail with reference to FIGS. 2a and 2b in the following manner:

A. The wireless device D1 sends data x1 in TDD timeslot 1, which data is received by the base station BS using existing technology. For this purpose, the base station BS may use known techniques to schedule an uplink transmission for the data x1. Parallel with this transmission and using the same radio resource of TDD timeslot 1, the same data x1 is also sent to and received by the wireless device D2. To achieve this, the base station BS configures the device D2 for the reception of x1 as part of a D2D bearer setup procedure. When device D1 sends x1 to the base station BS and its peer device D2, device D1 also stores its own transmitted data.

B. Upon reception and decoding of the data x1, the base station BS and device D2 both store x1 for subsequent processing. To enable this, device D2 has been configured by the base station BS to store the data x1.
C. In the next uplink TDD slot 2, device D2 sends its data x2 to the base station BS and to device D1 in a similar manner. It is assumed that device D1 has been instructed by the base station BS to await, decode and store the data x2 in TDD slot 2 following its own transmission in TDD slot 1 of data x1 to the device D2 and the base station BS.
D. Once the base station BS has received x1 and x2, it employs an operation in the form of function F(.,.) on x1 and x2, which operation may be linear. For example F(x1,x2) may be a simple XoR operation or it may involve other operations on x1 and x2.
E. In the subsequent downlink TDD timeslot, 5 in this example, the base station BS schedules a downlink transmission to both device D1 and device D2 and transmits the network coded data F(x1,x2) to device D1 and device D2 simultaneously.
F. Upon reception of the network coded data F(x1,x2) from the base station BS, device D1 performs a so called "combining" operation, to be described below. The device D2 performs a similar operation.

Figure 3:
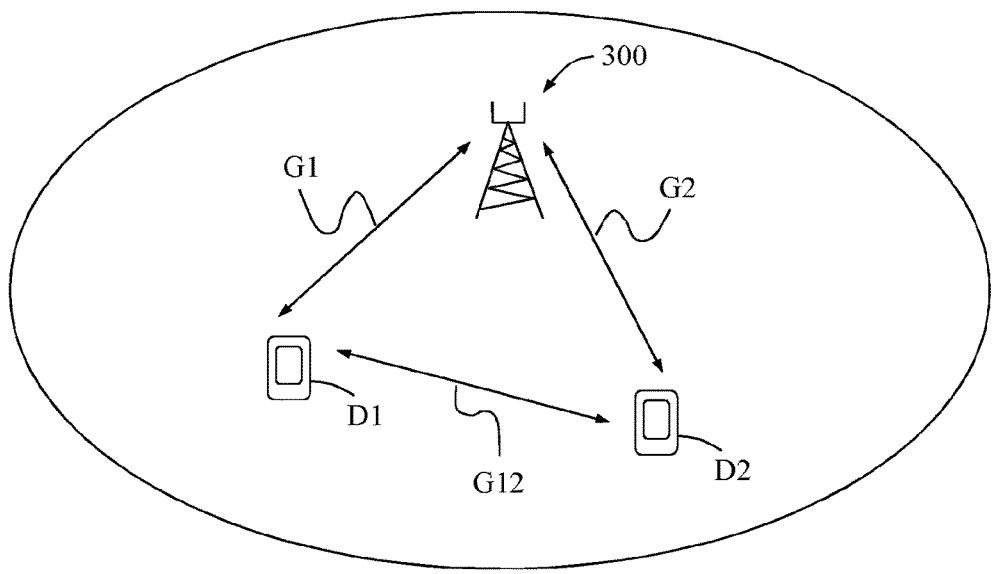
FIG. 3 illustrates path gains of various radio links, which can be used according to some possible embodiments.

It was mentioned above that in this solution the operation mode of D2D communication supported by NWC is applied when a threshold condition is satisfied, the threshold condition involving a path gain "G12" of a D2D radio link between the two devices D1 and D2 and path gains "G1" and "G2" of cellular radio links between the base station and the respective wireless devices D1, D2. These three path gains are shown in FIG. 3. An example of a procedure with actions, performed by a base station of a radio network, to support D2D communication over a D2D radio link between a first wireless device D1 and a second wireless device D2, will now be described with reference to the flow chart in FIG. 4 and also to FIG. 3, the base station being denoted 300. This procedure thus illustrates how the base station can apply a D2D communication supported by NWC under certain circumstances when the benefits of lower transmit power and reduced interference may be achieved. The base station is thus arranged or configured to perform the actions of the flow chart in FIG. 4.

A first action 400 illustrates that the base station 300 obtains a first path gain of the D2D radio link, i.e. the path gain G12 in FIG. 3. In this disclosure, the path gain G12 may also be denoted $G^{D2D}$. In a possible embodiment, the first path gain G12 of the D2D radio link may be obtained from measurements of the D2D radio link reported by at least one of the first and second wireless devices D1, D2. For example, device D1 and/or D2 may measure a link quality, e.g. in terms of path loss, of the D2D radio link based on signals received from the opposite peer, using any existing measurement technique, and report the measured link quality to the base station 300. The first path gain may be obtained by computing an average of the link quality measured and reported by device D1 and by device D2, respectively.

Another action 402 illustrates that the base station 300 further obtains a second path gain G1 of a cellular radio link between the base station and the first wireless device D1. The base station 300 also obtains, in another action 404, a third path gain G2 of a cellular radio link between the base station and the second wireless device D2. In this disclosure, either of the path gains G1 and G2 may also be denoted $G^{UE-BS}$. In another possible embodiment, the second and third path gains G1 and G2 may be obtained from measurements of the respective cellular radio links between the base station and the first and second wireless devices. For example, at least some of the measurements in this embodiment may be measurements of path loss which may be made by the base station and/or by the respective device D1, D2, e.g. according to known procedures. In the latter case, devices D1, D2 will need to report their path loss measurements to the base station 300.

Another action 406 illustrates that the base station 300 evaluates a threshold condition and determines whether the above-obtained first, second and third path gains satisfy the threshold condition or not. If they satisfy the threshold condition, the base station 300 decides to apply a D2D communication mode with NWC for the D2D communication, as illustrated by an action 408. Thus, it is assumed that the threshold condition has been defined such that the above-described benefits of reduced transmit power to or from the devices may be achieved in conjunction with adequate decoding of received radio signals by applying the D2D communication mode with NWC. As a result, the benefits of using lower transmit power means that power consumption is reduced in the respective device and that interference also may be reduced in the cell served by the base station and possibly also in one or more neighboring cells.

On the other hand, if it is determined in action 406 that the first, second and third path gains do not satisfy the threshold condition, some other mode of operation than the D2D communication mode with NWC is applied in another action 410. Examples of other modes of operation include direct D2D communication only, either on dedicated or reused radio resources, over the D2D link, and cellular communication only over cellular radio links between the base station and the respective wireless devices. In this context, dedicated radio resources may also be called orthogonal radio resources, and reused radio resources may also be called shared radio resources.

In some possible embodiments, the threshold condition may more specifically dictate that:
 the first path gain G12 is above a first predefined threshold which may be denoted "$\Theta_{D-D}$", and
 both the second path gain G1 and the third path gain G2 are below a second predefined threshold which may be denoted "$\Theta_{BS-D}$".
Thereby, the threshold condition requires that the path gain G12 of the D2D radio link is strong enough, i.e. higher than the first threshold $\Theta_{D-D}$, and also that the path gains of the cellular radio links are weak enough, i.e. lower than the second threshold $\Theta_{BS-D}$, in order to enable beneficial usage of the operation mode of D2D communication mode with NWC.

In another possible embodiment, the threshold condition may further dictate that a difference "G12-Gi" between the first path gain G12 and each of the second and third path gains Gi=G1, G2 is below a third predefined threshold which may be denoted "$\Theta_{delta}$". The threshold condition may thus further require that the above differences G12-Gi in path gains is small enough, i.e. lower than the third threshold $\Theta_{delta}$.

In another possible embodiment, the base station may apply the D2D communication mode with NWC in the manner described above for FIGS. 2a, 2b. Thus, the base station 300 may receive first data x1 sent in a first radio signal from the first wireless device D1, and also receive second data x2 sent in a second radio signal from the second wireless device D2. As seen from the perspective of device D2, the base station 300 then sends a network coded form of the first and second data F(x1,x2) to the second wireless device D2, thereby enabling the second wireless device to use the network coded form of the first and second data F(x1,x2) for decoding the first radio signal with data x1. Likewise at the same time, the base station 300 further sends the network coded form of the first and second data F(x1,x2) to the first wireless device D1, thereby enabling the first wireless device to use the network coded form of the first and second data F(x1,x2) for decoding the second radio signal with data x2.

The respective devices D1, D2 may decode the received data x2 and x1, respectively, aided by the network coded form F(x1,x2) by performing a combining operation which is known as such. In a possible embodiment, the base station 300 may signal to the second wireless device D2 a network coding function used for creating the network coded form of the first and second data F(x1,x2). An example of how this combining operation might be executed by a wireless device will be briefly outlined with reference to FIG. 9 later below.

It was mentioned above that the threshold condition should be defined such that the benefits of reduced transmit power to or from the devices may be achieved in conjunction with adequate decoding of received radio signals by applying the D2D communication mode with NWC. It will now be described an example of how this transmit power may be set for one or both of the devices. Thus in a possible embodiment, the base station may set a transmit power $P^{UE,NWC}$ of at least one of the first and second wireless devices according to the following formula:

$$P^{UE,NWC} = \min[P_{MAX}, \max[A,B]]$$

where $$A = P_0^{cell} - \alpha^{cell} \cdot G^{UE-BS} + 10 \cdot \log_{10} M^{cell},$$

$$B = P_0^{D2D} - \alpha^{D2D} \cdot G^{D2D} + 10 \cdot \log_{10} M^{D2D},$$

$P_{MAX}$ is a maximum allowed transmit power,
$P_0^{cell}$ a base power level to control cellular Signal to Noise Ratio, SNR,
$\alpha^{cell}$ is a path loss compensation factor applied on the respective cellular radio link,
$G^{UE-BS}$ is the path gain of the respective cellular radio link,
$M^{cell}$ is a number of scheduled Physical Resource Blocks, PBRs, on the respective cellular radio link,
$P_0^{D2D}$ is a base power level to control D2D SNR,
$\alpha^{D2D}$ path loss compensation factor applied on the D2D radio link,
$G^{D2D}$ is the path gain of the D2D radio link, and
$M^{D2D}$ is a number of scheduled PBRs on the D2D radio link.

Figure 5:
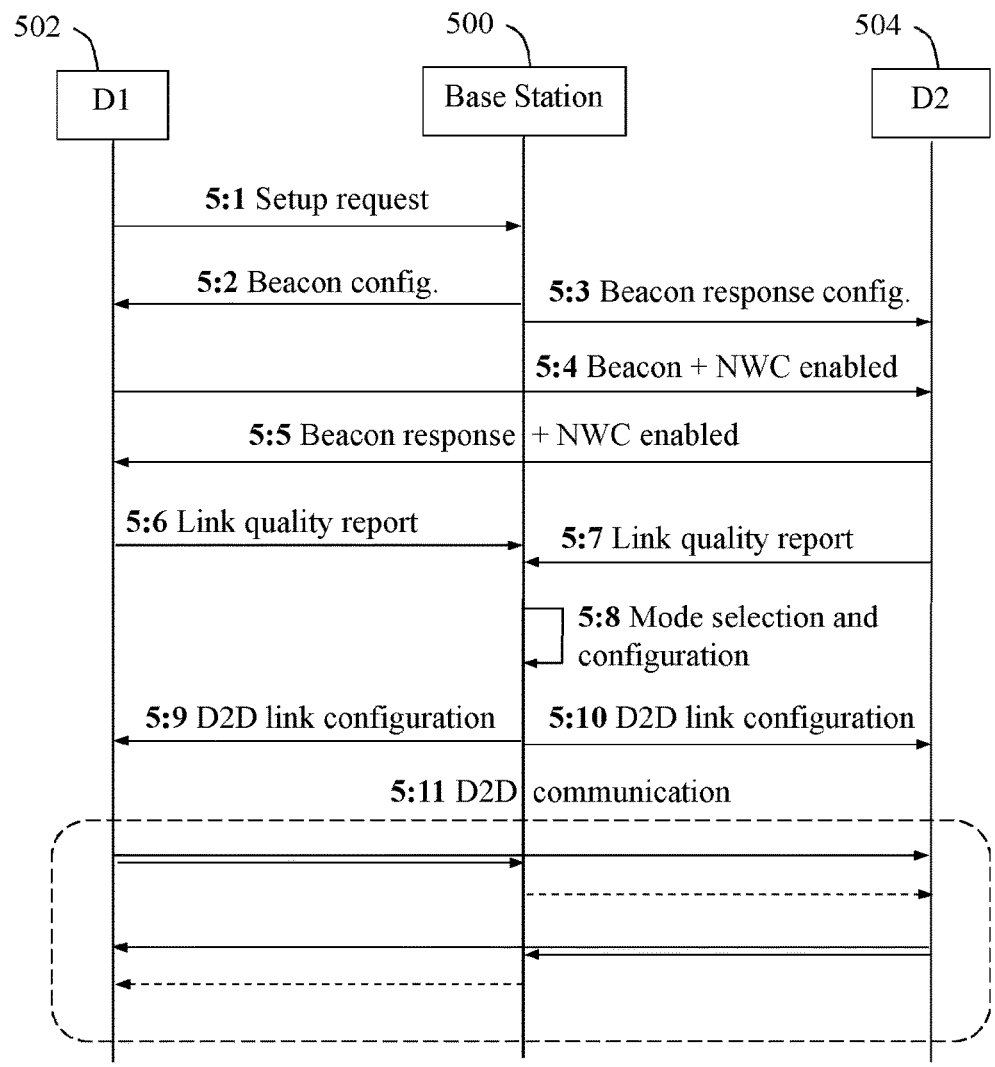
FIG. 5 is a signalling diagram illustrating an example of a procedure to set up D2D communication when the solution is used, according to further possible embodiments.

FIG. 5 illustrates an example of a signalling procedure that may be used for establishing a D2D communication mode with NWC for two wireless devices 502 and 504 as controlled and implemented by a base station denoted 500 in this figure. The procedure starts in this example when the first device D1, or 502, sends a setup request message to the base station 500 for a communication with device D2, or 504, as shown by a first action 5:1. In this setup request message, device D1 may inform the base station 500 about its own capabilities, including NWC related capabilities. Device D1 may also include information in the message about specific services it requires or offers. In the setup request message, device D1 may further indicate the specific device D2 with which the communication is to be established. The base station 500 may have received a similar setup request message from device D2, not shown.

Further, the base station 500 configures beacon signaling messages that device D1 and device D2, respectively, should use during a so-called network assisted peer discovery phase, by sending a configuration message to each device in action 5:2 and action 5:3. In this configuration message, the base station 500 may instruct the wireless devices what radio resources in time-frequency they should use when transmitting their beacon signals and what information they should include in the beacons. In networks employing Long Term Evolution, LTE, radio resources are specified as Physical Resource Blocks, PRBs. For example, the base station 500 may inform or instruct the wireless devices D1, D2 about which NWC functions they need to support to enable the operation mode of D2D communication with NWC. A straightforward function could be any linear combination of the broadcasted messages, for instance F(x1,x2) as described above.

Next, device D1 and device D2 use the configuration data as instructed by the base station 500 when they broadcast their beacons. Thus, an action 5:4 illustrates that device D1 transmits its beacon indicating that it is "NWC enabled". This allows device D2 to reply to device D1, in a so-called "page back signal" or "beacon response signal" in action 5:5, and indicate if their NWC capabilities match, i.e. by being likewise NWC enabled. This allows the base station 500 to consider the operation mode of D2D communication with NWC as a valid option when performing mode selection later.

Once the wireless devices D1 and D2 have detected each other, they both send a link quality report to the base station 500, which is illustrated by an 5:6 and an action 5:7, respectively. The link quality report thus indicates quality of the D2D link and optionally also quality of the respective cellular radio links between the base station and the devices D1 and D2, which link quality reports are useful as input to the mode selection decision to be made by the base station 500. In the link quality report, device D1 and device D2 may also include information indicating whether they support a common NWC function F(.,.).

Another action 5:8 illustrates that the base station 500 makes a decision of which operation mode to apply, which decision may be based on the link quality reports received in actions 5:6 and 5.7, and further on measurements made by the base station 500 on the respective cellular radio links between the base station and the first and second wireless devices. The base station 500 makes the mode selection decision based on the link quality reports and current resource usage and possibly other factors as well. In this example, the base station 500 may consider the following criteria, also discussed above, which may be necessary but not sufficient for selecting the operation mode of D2D communication with NWC:

The path gain of the D2D radio link between device D1 and device D2 is above the above-mentioned first predefined threshold $\ominus_{D\text{-}D}$;
The path gain of the cellular radio link between the base station 500 and respective device D1, D2 is below the above-mentioned second predefined threshold $\ominus_{BS\text{-}D}$;
The transmit powers of device D1, device D2, and the base station 500 need not be more than a certain limit;
A sufficient bandwidth is accessible to device D1 and device D2; and
The network coding function F(x1,x2) can be used by both devices D1, D2.

Further, action 5:9 and action 5:10 illustrate that the base station 500 configures the D2D link according to the mode selection decision in the foregoing action 5:8, by sending D2D link configuration messages to the respective devices D1 and D2. In the configuration messages, the base station 500 sends information that facilitates the decoding of network coded information in the configuring actions 5:9 and 5:10 above.

A final action 5:11 basically indicates that the D2D communication takes place, e.g. using D2D communication with NWC as described above, or else in some other operation mode if the threshold condition was not fulfilled in action 5:8. In action 5:11, the full arrows schematically indicate that data is transmitted by the devices D1, D2 while the dashed arrows schematically indicate that data is transmitted in network coded form by the base station 500.

A more detailed procedure with actions performed by a base station, of how the above-described threshold condition may be evaluated based on the above-described first, second and third predefined thresholds, will now be described with reference to the flow chart in FIG. 6. This evaluation procedure is performed also according to a table for mode selection shown in FIG. 7, to which reference will be made as well in the description below. FIG. 7 thus illustrates the threshold requirements of the three path gains G12, G1 and G2 for applying different operation modes 1-4 where Mode 1 is the pure cellular mode, Mode 2 is the D2D mode on dedicated radio resources, Mode 3 is the D2D mode on reused radio resources, and Mode 4 is the D2D mode with NWC.

In a first action 600, the base station obtains a first path gain of a D2D radio link between a first wireless device and a second wireless device, denoted G12 in FIG. 7. Some examples of how this action may be performed have been described above. The base station then checks in an action 602 whether the obtained first path gain is above the first threshold, denoted $\Theta_{D-D}$ in FIG. 7. If not, it can be deduced that the D2D radio link is not good enough for D2D communication and a conventional cellular mode of operation with no D2D communication is used in an action 604. This action corresponds to Mode 1 in FIG. 7.

On the other hand, if the first path gain G12 is above the first threshold $\Theta_{D-D}$, the base station proceeds to obtain a second path gain of a cellular radio link between the base station and the first wireless device, in an action 606. The base station further obtains a third path gain of a cellular radio link between the base station and the second wireless device, in another action 608. The second and third path gains are denoted Gi=G1 and Gi=G2, respectively, in FIG. 7. It should be noted that it is not necessary to obtain the first, second and third path gains in the sequence order shown in this example, but they could rather be obtained in any order depending on implementation. The base station then checks in an action 610 whether both of the second and third path gains G1, G2 are below the second threshold, denoted $\Theta_{BS-D}$ in FIG. 7. If not, it can be deduced that at least one of the cellular radio links is not weak enough for beneficial D2D communication with NWC, and a D2D communication mode of operation on dedicated radio resources is applied in an action 612. This action corresponds to Mode 2 in FIG. 7.

On the other hand, if the both of the second and third path gains G1, G2 are below the second threshold $\Theta_{BS-D}$, the base station further checks in an action 614 whether a difference G12−Gi between the first path gain G12 and each of the second and third path gains G1, G2 is below a third predefined threshold, denoted $\Theta_{delta}$ in FIG. 7. If not, it can be deduced that the path gain of at least one of the cellular radio links is too different from the D2D radio link for beneficial D2D communication with NWC, and a D2D communication mode of operation on reused radio resources is applied in an action 616. This action corresponds to Mode 3 in FIG. 7.

On the other hand, if the difference G12−Gi between the first path gain G12 and each of the second and third path gains G1, G2 is above the third threshold $\Theta_{delta}$, the base station applies the operation mode of D2D communication with NWC in a final shown action 618. This action corresponds to Mode 4 in FIG. 7.

A detailed but non-limiting example of how a base station of a radio network may be structured with some possible functional entities such as modules, circuits or units, to bring about the above-described functionality of the base station, is illustrated by the block diagram in FIG. 8. In this figure, the base station 800 is arranged to support D2D communication over a D2D radio link between a first wireless device D1 and a second wireless device D2. The base station 800 may be configured to operate according to any of the examples and embodiments of employing the solution as described above and as follows. In particular, the base station 800 may be arranged or configured to perform at least the actions of the flow chart in FIG. 4 in the manner described above.

The base station 800 comprises a suitable communication module 800a with radio circuitry for conducting radio communication with the wireless devices D1 and D2. The network node 600 also comprises an obtaining module 600b which is configured to:

obtain a first path gain G12 of the D2D radio link, e.g. according to the above description of action 400, obtain a second path gain G1 of a cellular radio link between the base station and the first wireless device, e.g. according to the above description of action 402, and obtain a third path gain G2 of a cellular radio link between the base station and the second wireless device, e.g. according to the above description of action 404.

The base station 800 also comprises a logic module 800c which is configured to apply a D2D communication mode with network coding for the D2D communication when the first, second and third path gains satisfy a threshold condition, e.g. according to the above description of actions 406-408. Examples of how the threshold condition may be defined have been described above.

The above base station 800 and its functional modules may be configured or arranged to operate according to various optional embodiments. In a possible embodiment, the logic module 800c may be configured to apply the D2D communication mode with network coding by receiving first data sent in a first radio signal from the first wireless device, receiving second data sent in a second radio signal from the second wireless device, and sending a network coded form of the first and second data to the second wireless device. Thereby, the second wireless device is enabled to use the network coded form of the first and second data for decoding the first radio signal. In this case, the logic module 800c may also be configured to signal to the second wireless device a network coding function used for creating the network coded form of the first and second data.

In another possible embodiment, the obtaining module 800b may be configured to obtain the first path gain G12 of the D2D radio link from measurements of the D2D radio link reported by at least one of the first and second wireless devices D1, D2.

In another possible embodiment, the obtaining module 800b may be configured to obtain the second path gain G1 and the third path gain G2 from measurements of the respective cellular radio links between the base station and the first and second wireless devices D1, D2. For example, at least some of the measurements mentioned in the latter two embodiments may be path loss measurements, as described above.

In yet another possible embodiment, the logic module 800c may be configured to set a transmit power $P^{UE,NWC}$ of at least one of the first and second wireless devices as:

$$P^{UE,NWC} = \min[P_{MAX}, \max[A,B]]$$

where $P_{MAX}$ is a maximum allowed transmit power. A and B and various parameters therein have been defined and described above. This embodiment is thus an example, without limitation, of how the transmit power can be set for one or both of the first and second wireless devices such that the benefit of reduced transmit power to or from the devices in conjunction may be achieved together with adequate decoding of received radio signals by applying the D2D communication mode with NWC.

It should be noted that FIG. 8 illustrates some possible functional modules 800a-d in the base station 800 and the skilled person is able to implement these functional modules in practice using suitable software and hardware. Thus, the solution is generally not limited to the shown structures of the base station 800, and the functional modules 800a-d may be configured to operate according to any of the features described in this disclosure, where appropriate.

Figure 4:
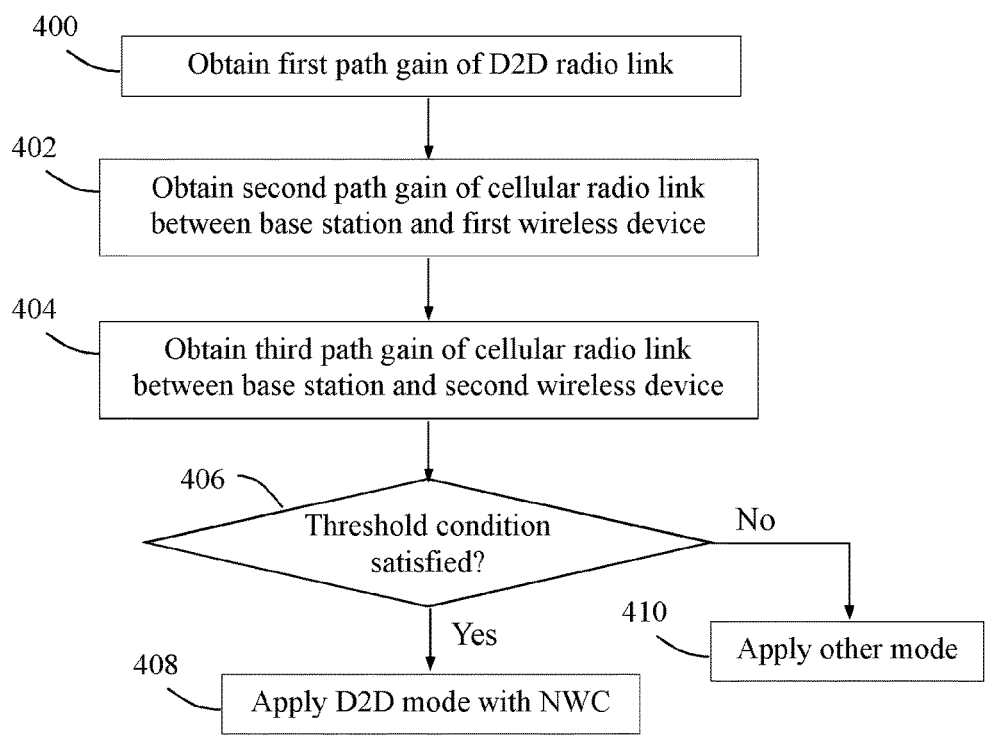
FIG. 4 is a flow chart illustrating a procedure in a base station, according to further possible embodiments.
Figure 6:
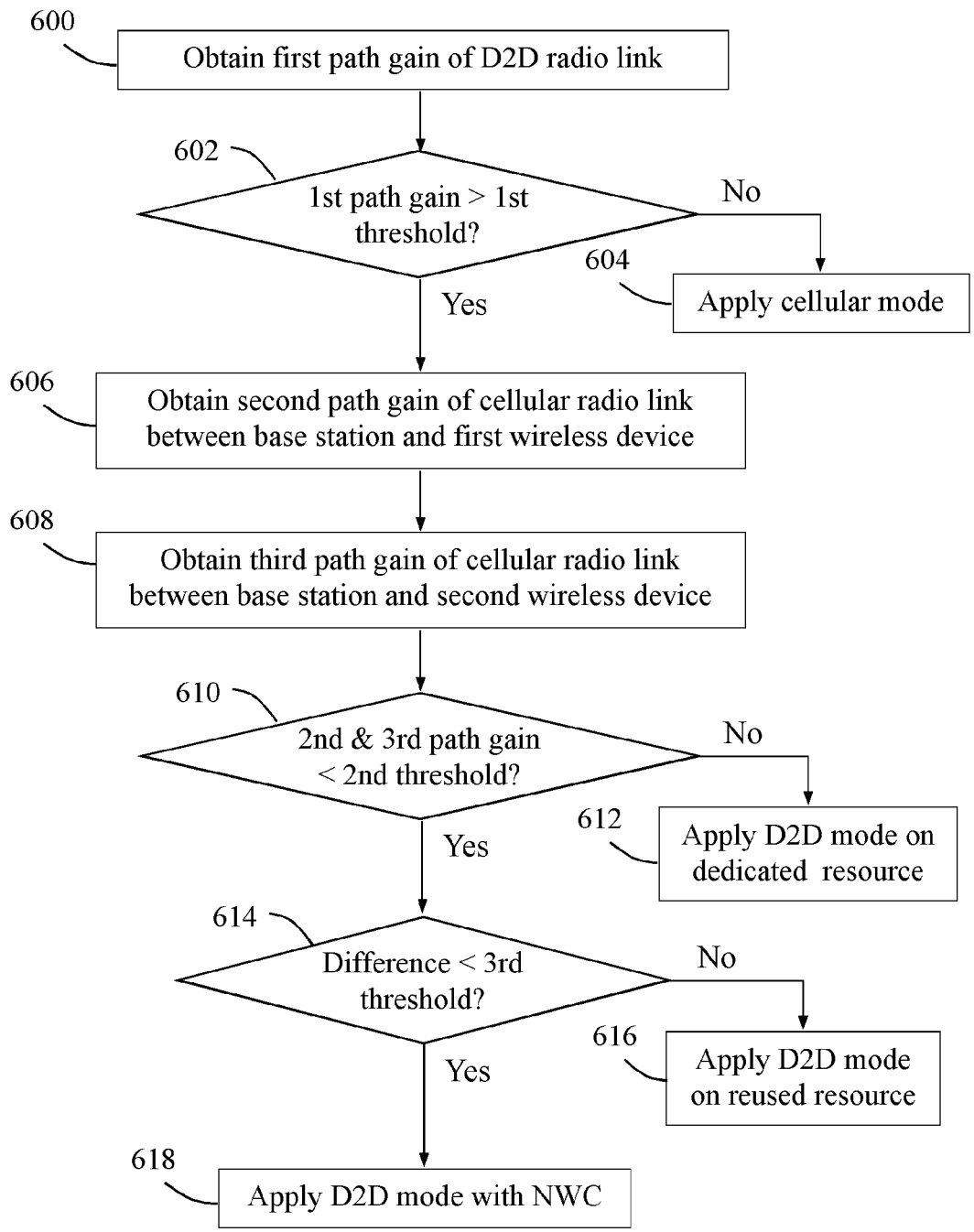
FIG. 6 is another flow chart illustrating a more detailed procedure in a base station, according to further possible embodiments.
Figures 7, 8:
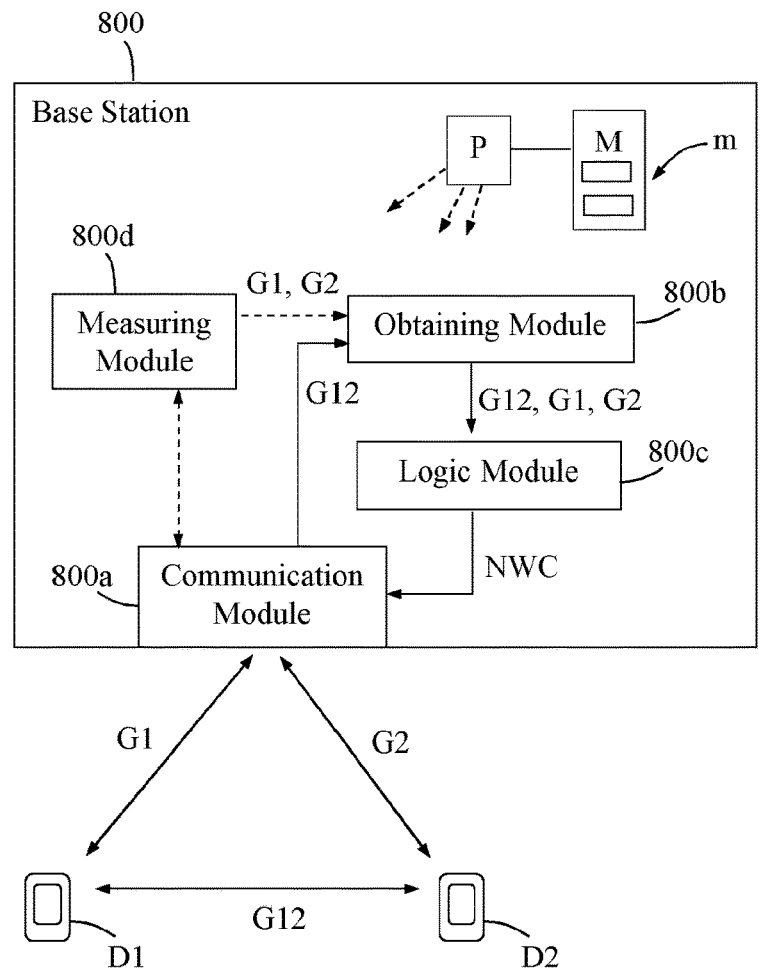
FIG. 7 is a table for mode selection which may be used when implementing the solution, according to further possible embodiments.
FIG. 8 is a block diagram illustrating a base station in more detail, according to further possible embodiments.

The embodiments and features described herein may be implemented in a computer program comprising computer readable code which, when run on a base station, causes the base station to perform the above actions e.g. as described for FIGS. 4 to 6 and the appropriate functionality described for the base station 800 in FIG. 8. Further, the above-described embodiments may be implemented in a computer program product comprising a computer readable medium on which a computer program is stored. The computer program product may be a compact disc or other carrier suitable for holding the computer program. The computer program comprises computer readable code which, when run on a base station 800, causes the base station 800 to perform the above actions. Some examples of how the computer program and computer program product can be realized in practice are outlined below.

The functional modules 800a-d described above for FIG. 8 may be implemented in the base station 800 by means of program modules of a respective computer program comprising code means which, when run by a processor "P" causes the base station 800 to perform the above-described actions and procedures. The processor P may comprise a single Central Processing Unit (CPU), or could comprise two or more processing units. For example, the processor P may include a general purpose microprocessor, an instruction set processor and/or related chips sets and/or a special purpose microprocessor such as an Application Specific Integrated Circuit (ASIC). The processor P may also comprise a storage for caching purposes.

Each computer program may be carried by a computer program product in the base station 800 in the form of a memory "M" having a computer readable medium and being connected to the processor P. The computer program product or memory M thus comprises a computer readable medium on which the computer program is stored e.g. in the form of computer program modules "m". For example, the memory M may be a flash memory, a Random-Access Memory (RAM), a Read-Only Memory (ROM) or an Electrically Erasable Programmable ROM (EEPROM), and the program modules m could in alternative embodiments be distributed on different computer program products in the form of memories within the base station 800.

It was mentioned above that the wireless devices D1, D2 may decode the received data aided by the network coded form F(x1,x2) of the data by performing a combining operation that may be known as such. In this context, "combining" means that the device produces an estimate of the data that has been transmitted by its peer device. The receiving device uses the data received from its peer device and the network coded data received from the base station, as well as its own transmitted data which has been saved by the device as described above.

Figure 9:
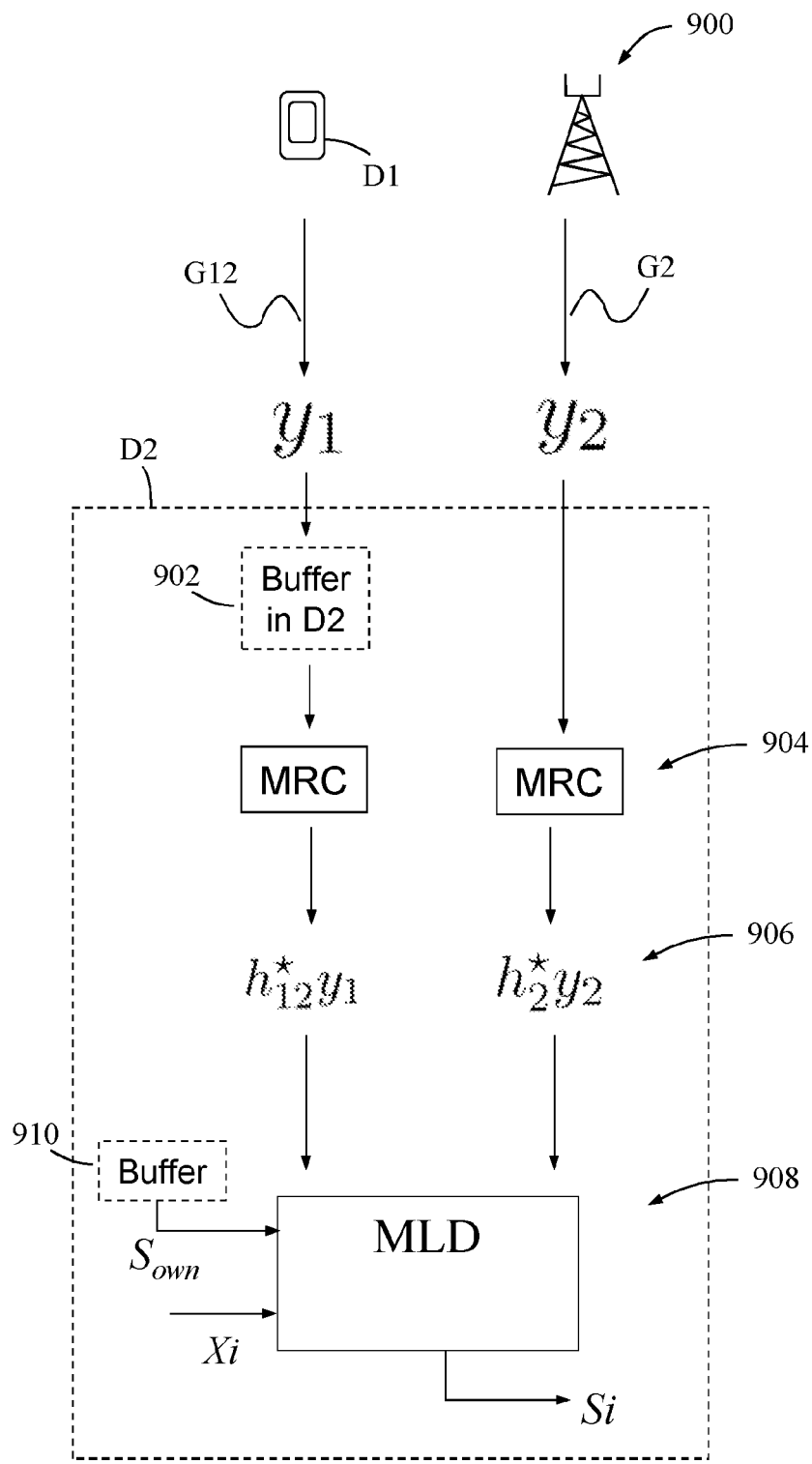
FIG. 9 is a diagram illustrating how a combining operation may be executed by a wireless device when the solution is employed.

An example of how such a combining operation might be executed by a wireless device D2 is illustrated by FIG. 9 and reference will also be made to the example illustrated by FIGS. 2a and 2b. The device D2 receives a signal $y_1$ from device D1 over the D2D radio link with the path gain G12 in the TDD timeslot 1. Numeral 902 indicates that the signal $y_1$ is temporarily buffered in device D2. The device D2 also transmits its own data which comprises a symbol denoted $S_{own}$ which device D2 stores in a buffer 910. Device D2 further receives a signal $y_2$ from the base station 900 over the cellular link with the path gain G2 at a later point in the TDD timeslot 5.

To execute the combining operation, the device D2 may perform Maximum Likelihood Detection, MLD, according to existing techniques. To this end, the device D2 needs to know the specific function F(.,.) that was used by the base station 900 to generate the network coded data. When performing the MLD operation, the device D2 applies this specific function F(.,.) to the elements of a set of possible symbols Xi and its own transmitted symbol $S_{own}$, to compute F(Xi, x1), since this quantity is needed in the MLD operation. The comparison between the signal $y_1$ received from the device D1 and the elements of the set containing the possible Xi values is also part of the MLD operation, according to the known MLD technique.

Returning to FIG. 9, numeral 904 indicates that device D2 performs a Maximum Ratio Combining, MRC, operation on each of the signals $y_1$ and $y_2$. The output from the MRC operation is a complex conjugate $h^*_{12}y_1$ of a complex channel coefficient of the D2D link between D1 and D2, and a complex conjugate $h^*_2 y_2$ of a complex channel coefficient of the cellular link between the base station 300 and D2. These two complex conjugates 906 are applied in the MLD operation 908 for different combinations of the own transmitted symbol $S_{own}$ that was stored in the buffer 910, and each of the set of possible symbols Xi. The outcome of this MLD operation 908 is an estimated symbol $S_i$ of the data x1 embedded in the signal $y_1$ received from the device D1.

By performing such a combining operation e.g. as outlined above, the device D2 is able to decode the signal $y_1$ received from the device D1 by assistance from the signal $y_2$ from the base station 900 with greater accuracy and reliability, by achieving e.g. lower Symbol Error Rate, SER and low Bit Error Rate, BER in the communication. Thereby, it is possible to reduce the transmit power at device D1 since it does not have to be as strong as when NWC is not applied. It should be noted that the operation in FIG. 9 may likewise be performed by the device D1 as well for decoding a signal sent from the device D2.

While the solution has been described with reference to specific exemplary embodiments, the description is generally intended to illustrate the inventive concept and should not be taken as limiting the scope of the solution. For example, the terms "base station", "wireless device" and "network coding" have been used throughout this description, although any other corresponding entities, functions, and/or parameters could also be used having the features and characteristics described here. The solution is defined by the appended claims.

The invention claimed is:

1. A method in a base station of a radio network, for supporting Device-to-Device (D2D) communication over a D2D radio link between a first wireless device and a second wireless device, the method comprising:
   obtaining a first path gain of the D2D radio link;
   obtaining a second path gain of a cellular radio link between the base station and the first wireless device;
   obtaining a third path gain of a cellular radio link between the base station and the second wireless device;
   responsive to determining that the first path gain is large enough to support the D2D communication: selecting between a D2D communication mode that uses network coding and a D2D communication mode that does not use network coding, in dependence on the second and third path gains; and
   applying the selected D2D communication mode for the D2D communication.

2. The method according to claim 1, wherein determining that the first path gain is large enough to support the D2D communication comprises determining that the first path gain is above a first predefined threshold, and wherein selecting between the D2D communication mode that uses network coding and the D2D communication mode that does not use network coding comprises selecting the D2D communication mode that uses network coding when both the second path gain and the third path gain are below a second predefined threshold.

3. The method according to claim 1, wherein selecting between the D2D communication mode that uses network coding and the D2D communication mode that does not use network coding comprises selecting the D2D communication mode that uses network coding when both the second path gain and the third path gain are below a second predefined threshold and a difference between the first path gain and each of the second and third path gains is below a third predefined threshold.

4. The method according to claim 1, wherein, when the D2D communication mode that uses network coding is the selected D2D communication mode, applying the selected D2D communication mode comprises receiving first data sent in a first radio signal from the first wireless device, receiving second data sent in a second radio signal from the second wireless device, and sending a network coded form of the first and second data to the second wireless device, thereby enabling the second wireless device to use the network coded form of the first and second data for decoding the first radio signal.

5. The method according to claim 4, further comprising signalling to the second wireless device a network coding function used for creating the network coded form of the first and second data.

6. The method according to claim 1, wherein the first path gain of the D2D radio link is obtained from measurements of the D2D radio link reported by at least one of the first and second wireless devices.

7. The method according to claim 1, wherein the second path gain and the third path gain are obtained from measurements of the respective cellular radio links between the base station and the first and second wireless devices.

8. The method according to claim 6, wherein at least some of the measurements are path loss measurements.

9. The method according to claim 1, wherein a transmit power $P^{UE,NWC}$ of at least one of the first and second wireless devices is set as:

$$P^{UE,NWC} = \min[P_{MAX}, \max[A,B]]$$

where $$A = P_0^{cell} - \alpha^{cell} \cdot G^{UE\text{-}BS} + 10 \cdot \log_{10} M^{cell},$$

$$B = P_0^{D2D} - \alpha^{D2D} \cdot G^{D2D} + 10 \cdot \log_{10} M^{D2D},$$

$P_{MAX}$ is a maximum allowed transmit power,
$P_0^{cell}$ is a base power level to control cellular Signal to Noise Ratio (SNR),
$\alpha^{cell}$ is a path loss compensation factor applied on the respective cellular radio link,
$G^{UE\text{-}BS}$ is the path gain of the respective cellular radio link,
$M^{cell}$ a number of scheduled Physical Resource Blocks (PBRs) on the respective cellular radio link,
$P_0^{D2D}$ is a base power level to control D2D SNR,
$\alpha^{D2D}$ is a path loss compensation factor applied on the D2D radio link,
$G^{D2D}$ is the path gain of the D2D radio link, and
$M^{D2D}$ is a number of scheduled PBRs on the D2D radio link.

10. A base station of a radio network, the base station being arranged to support Device-to-Device (D2D) communication over a D2D radio link between a first wireless device and a second wireless device, the base station comprising:
   a communication circuit comprising radio circuitry for conducting radio communication with the first and second wireless devices, and processing circuitry operatively associated with the radio circuitry and configured to:
      obtain a first path gain of the D2D radio link;
      obtain a second path gain of a cellular radio link between the base station and the first wireless device;
      obtain a third path gain of a cellular radio link between the base station and the second wireless device;
      responsive to determining that the first path gain is large enough to support the D2D communication: select between a D2D communication mode that uses network coding and a D2D communication mode that does not use network coding, in dependence on the second and third path gains; and
      apply the selected D2D communication mode for the D2D communication.

11. The base station according to claim 10, wherein the processing circuitry is configured to determine that the first path gain is large enough to support the D2D communication by determining that the first path gain is above a first predefined threshold, and is further configured to select between the D2D communication mode that uses network coding and the D2D communication mode that does not use network coding comprises selecting the D2D communication mode that uses network coding when both the second path gain and the third path gain are below a second predefined threshold.

12. The base station according to claim 10, wherein the processing circuitry is configured to select between the D2D communication mode that uses network coding and the D2D communication mode that does not use network coding by selecting the D2D communication mode that uses network coding when both the second path gain and the third path gain are below a second predefined threshold and a difference between the first path gain and each of the second and third path gains is below a third predefined threshold.

13. The base station according to claim 10, wherein, when the D2D communication mode that uses network coding is the selected D2D communication mode, applying the selected D2D communication mode comprises the processing circuitry receiving first data sent in a first radio signal from the first wireless device, receiving second data sent in a second radio signal from the second wireless device, and sending a network coded form of the first and second data to the second wireless device, thereby enabling the second wireless device to use the network coded form of the first and second data for decoding the first radio signal.

14. The base station according to claim 13, wherein the processing circuitry is configured to signal to the second wireless device a network coding function used for creating the network coded form of the first and second data.

15. The base station according to claim 10, wherein the processing circuitry is configured to obtain the first path gain of the D2D radio link from measurements of the D2D radio link reported by at least one of the first and second wireless devices.

16. The base station according to claim 10, wherein the processing circuitry is configured to obtain the second path gain and the third path gain from measurements of the respective cellular radio links between the base station and the first and second wireless devices.

17. The base station according to claim 15, wherein at least some of the measurements are path loss measurements.

18. The base station according to claim 10, wherein the processing circuitry is configured to set a transmit power $P^{UE,NWC}$ of at least one of the first and second wireless devices as:

$$P^{UE,NWC} = \min[P_{MAX}, \max[A, B]]$$

where $$A = P_0^{cell} - \alpha^{cell} \cdot G^{UE\text{-}BS} + 10 \cdot \log_{10} M^{cell},$$

$$B = P_0^{D2D} - \alpha^{D2D} \cdot G^{D2D} + 10 \cdot \log_{10} M^{D2D},$$

$P_{MAX}$ is a maximum allowed transmit power,
$P_0^{cell}$ is a base power level to control cellular Signal to Noise Ratio (SNR),
$\alpha^{cell}$ is a path loss compensation factor applied on the respective cellular radio link,
$G^{UE\text{-}BS}$ is the path gain of the respective cellular radio link,
$M^{cell}$ is a number of scheduled Physical Resource Blocks (PBRs) on the respective cellular radio link,
$P_0^{D2D}$ is a base power level to control D2D SNR,
$\alpha^{D2D}$ is a path loss compensation factor applied on the D2D radio link,
$G^{D2D}$ is the path gain of the D2D radio link, and
$M^{D2D}$ is a number of scheduled PBRs on the D2D radio link.

19. A non-transitory computer-readable medium storing a computer program comprising program instructions that, when executed by processing circuitry of a base station that is configured for operation in a radio network and for supporting Device-to-Device (D2D) communication over a D2D radio link between a first wireless device and a second wireless device, configures the base station to:
obtain a first path gain of the D2D radio link;
obtain a second path gain of a cellular radio link between the base station and the first wireless device;
obtain a third path gain of a cellular radio link between the base station and the second wireless device;
responsive to determining that the first path gain is large enough to support the D2D communication: select between a D2D communication mode that uses network coding and a D2D communication mode that does not use network coding, in dependence on the second and third path gains; and
apply the selected D2D communication mode for the D2D communication.

* * * * *